United States Patent
Levings et al.

(10) Patent No.: US 9,670,911 B2
(45) Date of Patent: Jun. 6, 2017

(54) MANIFOLDING ARRANGEMENT FOR A MODULAR HEAT-EXCHANGE APPARATUS

(75) Inventors: Natalie B. Levings, Palm Beach Gardens, FL (US); Eugene C. Jansen, Dumfries, VA (US); Jared D. Gilbert, Dale City, VA (US); Nicholas J. Nagurny, Manassas, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 1068 days.

(21) Appl. No.: 13/032,119

(22) Filed: Feb. 22, 2011

(65) Prior Publication Data
US 2012/0080175 A1 Apr. 5, 2012

Related U.S. Application Data

(60) Provisional application No. 61/388,881, filed on Oct. 1, 2010.

(51) Int. Cl.
| F03G 7/04 | (2006.01) |
| F28F 9/02 | (2006.01) |
| F28F 9/26 | (2006.01) |
| F28F 13/08 | (2006.01) |
| F03G 7/05 | (2006.01) |

(52) U.S. Cl.
CPC .............. F03G 7/05 (2013.01); *Y02E 10/34* (2013.01)

(58) Field of Classification Search
CPC .................................. F03G 7/05; Y02E 10/34
USPC .......... 165/173–175, 47, 143–145, 150–153, 165/147; 60/541.6, 641.6, 641.7; 141/384–386
See application file for complete search history.

(56) References Cited

U.S. PATENT DOCUMENTS

| 1,622,664 A | 3/1927 | Murray et al. |
| 2,040,947 A | 5/1936 | Mojonnier et al. |
| 2,071,277 A | 2/1937 | Barclay et al. |
| 2,083,028 A | 6/1937 | Livar |
| 2,229,554 A | 1/1941 | Cummings |
| 2,347,957 A | 5/1944 | McCullough |
| 2,424,265 A | 7/1947 | Allen |
| 2,540,339 A | 2/1951 | Kritzer |

(Continued)

FOREIGN PATENT DOCUMENTS

| CN | 1333868 A | 1/2002 |
| CN | 2821508 Y | 9/2006 |

(Continued)

OTHER PUBLICATIONS

English translation of the Japanese patent JP570184731, Translated by the Mcelroy Translation Company, Nov. 2013.*

(Continued)

*Primary Examiner* — Deming Wan
(74) *Attorney, Agent, or Firm* — Withrow & Terranova, PLLC (57) ABSTRACT

A heat-exchanger module that conveys a fluid through one or more heat exchangers with little or no pressure drop is presented. The heat-exchanger module comprises a first manifold that smoothly channels the fluid from a fluid source to each of the heat exchangers. The heat-exchanger module further comprises a second manifold that smoothly channels the fluid from the heat exchangers to a fluid sink. The manifolds are dimensioned and arranged to mitigate development of pressure drops in the fluid flow.

15 Claims, 5 Drawing Sheets

(56) References Cited

U.S. PATENT DOCUMENTS

| | | |
|---|---|---|
| 2,653,211 A | 9/1953 | Andrus |
| 2,938,712 A | 5/1960 | Pellmyr |
| 2,995,343 A | 8/1961 | Gardner et al. |
| 3,294,162 A | 12/1966 | Loehlein et al. |
| 3,460,611 A | 8/1969 | Folsom et al. |
| 3,476,179 A | 11/1969 | Meister et al. |
| 3,595,310 A | 7/1971 | Burne et al. |
| 3,761,384 A | 9/1973 | Ruthel et al. |
| 3,805,515 A | 4/1974 | Zener |
| 3,807,494 A * | 4/1974 | Ris .................. 165/110 |
| 3,825,061 A | 7/1974 | Bathla |
| 3,881,547 A | 5/1975 | Lavering |
| 4,055,145 A | 10/1977 | Mager et al. |
| 4,095,646 A | 6/1978 | Granetzke |
| 4,098,329 A | 7/1978 | Culver |
| 4,099,928 A | 7/1978 | Norback |
| 4,103,647 A | 8/1978 | Dörling et al. |
| 4,149,591 A | 4/1979 | Albertsen |
| 4,150,719 A | 4/1979 | Thielen et al. |
| 4,253,516 A | 3/1981 | Giardina |
| 4,276,927 A | 7/1981 | Foust |
| 4,294,564 A | 10/1981 | Person et al. |
| 4,323,114 A | 4/1982 | Corey |
| 4,350,014 A | 9/1982 | Sanchez et al. |
| 4,355,684 A | 10/1982 | Caines |
| 4,401,155 A | 8/1983 | Royal et al. |
| 4,432,307 A | 2/1984 | Godin |
| 4,478,277 A | 10/1984 | Friedman et al. |
| 4,592,416 A | 6/1986 | Mattison et al. |
| 4,625,794 A * | 12/1986 | Durst .................. F24J 2/201 126/669 |
| 4,633,819 A | 1/1987 | Tilliette |
| 4,688,631 A | 8/1987 | Peze et al. |
| 4,693,304 A | 9/1987 | Volland |
| 4,729,427 A | 3/1988 | Baumann |
| 4,729,428 A | 3/1988 | Yasutake et al. |
| 4,738,309 A | 4/1988 | Schilling |
| 4,753,773 A | 6/1988 | Garabedian et al. |
| 4,782,571 A | 11/1988 | Krips et al. |
| 4,941,530 A | 7/1990 | Crowe |
| 5,042,572 A | 8/1991 | Dierbeck |
| 5,137,080 A | 8/1992 | Haasch et al. |
| 5,178,822 A | 1/1993 | Buford, III et al. |
| 5,285,843 A | 2/1994 | Dierbeck |
| 5,289,870 A | 3/1994 | Dierbeck |
| 5,303,770 A | 4/1994 | Dierbeck |
| 5,448,830 A | 9/1995 | Borchert et al. |
| 5,452,758 A | 9/1995 | Mauterer |
| 5,499,674 A | 3/1996 | Bartz et al. |
| 5,513,700 A * | 5/1996 | Kleve et al. .................. 165/153 |
| 5,566,881 A * | 10/1996 | Inoue .................. B60H 1/00485 137/599.14 |
| 5,590,707 A | 1/1997 | Mauterer |
| 5,655,600 A | 8/1997 | Dewar et al. |
| 5,775,412 A | 7/1998 | Montestruc, III et al. |
| 5,813,592 A | 9/1998 | Midling et al. |
| 5,988,266 A | 11/1999 | Smith et al. |
| 6,009,938 A | 1/2000 | Smith et al. |
| 6,035,928 A | 3/2000 | Ruppel et al. |
| 6,059,026 A * | 5/2000 | Bailly et al. .................. 165/174 |
| 6,106,789 A | 8/2000 | Thompson et al. |
| 6,173,493 B1 | 1/2001 | Dierbeck |
| 6,390,185 B1 | 5/2002 | Proeschel |
| 6,637,109 B2 | 10/2003 | Nyqvist |
| 6,808,689 B1 | 10/2004 | Matsumoto et al. |
| 6,819,561 B2 | 11/2004 | Hartzell et al. |
| 6,901,660 B2 | 6/2005 | Miska |
| 6,945,322 B2 | 9/2005 | Ikeda |
| 7,055,576 B2 * | 6/2006 | Fernstrum .................. 165/44 |
| 7,165,605 B2 | 1/2007 | Park et al. |
| 7,328,578 B1 | 2/2008 | Saucedo |
| 7,549,466 B2 * | 6/2009 | Hayashi et al. .................. 165/176 |
| 7,726,388 B2 | 6/2010 | Toda |
| 7,921,558 B2 * | 4/2011 | Beamer et al. .................. 29/890.043 |
| 7,926,558 B2 * | 4/2011 | Hagberg .................. 165/174 |
| 7,967,060 B2 * | 6/2011 | Trumbower et al. .................. 165/174 |
| 8,540,012 B2 | 9/2013 | Nagurny et al. |
| 2002/0038702 A1 | 4/2002 | Font-Freide et al. |
| 2002/0153130 A1 | 10/2002 | Okamoto et al. |
| 2002/0162651 A1 | 11/2002 | Nakagome et al. |
| 2005/0061485 A1 | 3/2005 | Hirafuji et al. |
| 2005/0103482 A1 | 5/2005 | Park et al. |
| 2005/0133567 A1 | 6/2005 | Runyan |
| 2005/0173103 A1 | 8/2005 | Dawson |
| 2006/0175051 A1 * | 8/2006 | Kinoshita .................. 165/287 |
| 2007/0029070 A1 | 2/2007 | Yamamoto et al. |
| 2007/0131399 A1 | 6/2007 | Digele |
| 2007/0138237 A1 | 6/2007 | Nishikawa et al. |
| 2007/0284095 A1 | 12/2007 | Wang et al. |
| 2008/0029254 A1 * | 2/2008 | Sekito et al. .................. 165/148 |
| 2008/0078536 A1 | 4/2008 | Tolani |
| 2008/0135219 A1 | 6/2008 | Doh et al. |
| 2008/0241615 A1 | 10/2008 | Sugimasa et al. |
| 2009/0008066 A1 | 1/2009 | Meng et al. |
| 2009/0065178 A1 | 3/2009 | Kasezawa et al. |
| 2009/0140428 A1 | 6/2009 | Bonilla et al. |
| 2009/0159643 A1 | 6/2009 | Wimmer et al. |
| 2009/0229804 A1 | 9/2009 | Zebuhr |
| 2009/0294110 A1 | 12/2009 | Foust |
| 2009/0308582 A1 | 12/2009 | Nagurny et al. |
| 2011/0011570 A1 | 1/2011 | Levings et al. |
| 2011/0011572 A1 | 1/2011 | Nagurny et al. |
| 2011/0079375 A1 | 4/2011 | Nagurny et al. |
| 2011/0120126 A1 | 5/2011 | Srinivasan |
| 2011/0127022 A1 | 6/2011 | Eller et al. |
| 2011/0173978 A1 | 7/2011 | Rekret et al. |
| 2012/0011849 A1 | 1/2012 | Cole et al. |
| 2012/0073291 A1 | 3/2012 | Shapiro et al. |
| 2012/0125561 A1 | 5/2012 | Levings et al. |
| 2012/0199331 A1 | 8/2012 | Maurer et al. |
| 2013/0042612 A1 | 2/2013 | Shapiro et al. |
| 2013/0042613 A1 | 2/2013 | Ross et al. |
| 2013/0042996 A1 | 2/2013 | Hwang et al. |

FOREIGN PATENT DOCUMENTS

| | | | |
|---|---|---|---|
| DE | 2351529 A1 | 4/1975 | |
| DE | 19624937 A1 | 1/1998 | |
| DE | 102005058314 A1 | 6/2007 | |
| DE | 102007021420 A1 | 11/2008 | |
| EP | 0174554 A1 | 3/1986 | |
| EP | 1033546 A2 | 9/2000 | |
| EP | 2072938 A2 | 6/2009 | |
| FR | 1374955 A | 10/1964 | |
| FR | 1559076 A | 3/1969 | |
| FR | 2510729 A1 | 2/1983 | |
| GB | 969319 A | 9/1964 | |
| GB | 2424265 A | 9/2006 | |
| JP | S5420690 B2 | 7/1979 | |
| JP | 57018473 | * 1/1982 | ............ F03G 7/04 |
| JP | 57018473 A | * 1/1982 | ............ F03G 7/04 |
| JP | S6131889 A | 2/1986 | |
| JP | S61213493 A | 9/1986 | |
| JP | S6288169 U | 6/1987 | |
| JP | 62158996 A | 7/1987 | |
| JP | S62158996 A | 7/1987 | |
| JP | S62136770 U | 8/1987 | |
| JP | S62233684 A | 10/1987 | |
| JP | S6317961 U | 2/1988 | |
| JP | S63169494 A | 7/1988 | |
| JP | S6344708 Y2 | 11/1988 | |
| JP | 02077469 A | 3/1990 | |
| JP | 02084252 A | 3/1990 | |
| JP | H04214191 A | 8/1992 | |
| JP | H11503816 A | 3/1993 | |
| JP | H05308829 A | 11/1993 | |
| JP | H05340342 A | 12/1993 | |
| JP | H622017 U | 3/1994 | |
| JP | H0645159 Y2 | 11/1994 | |
| JP | 10005681 A | 1/1998 | |
| JP | H10339588 A | 12/1998 | |
| JP | H1147960 A | 2/1999 | |
| JP | 11264691 A | 9/1999 | |
| JP | 2000073164 A | 3/2000 | |

(56) References Cited

FOREIGN PATENT DOCUMENTS

| JP | 2001133195 A | 5/2001 |
|---|---|---|
| JP | 2002066720 A | 3/2002 |
| JP | 2003037386 A | 2/2003 |
| JP | 2004167334 A | 6/2004 |
| JP | 3102194 U | 7/2004 |
| JP | 2005194624 A | 7/2005 |
| JP | 2006026721 A | 2/2006 |
| JP | 2006205252 A | 2/2006 |
| JP | 2006207950 A | 8/2006 |
| JP | 2006289481 A | 10/2006 |
| JP | 2006297437 A | 11/2006 |
| JP | 2006337000 A | 12/2006 |
| JP | 2007511735 A | 5/2007 |
| JP | 2007163073 A | 6/2007 |
| JP | 2007203347 A | 8/2007 |
| JP | 2008503047 A | 1/2008 |
| JP | 2008070026 A | 3/2008 |
| JP | 2008239451 A | 10/2008 |
| JP | 2009517625 A | 4/2009 |
| JP | 3178668 U | 9/2012 |
| KR | 1020080076222 A | 8/2008 |
| WO | 9632618 A1 | 10/1996 |
| WO | 9749962 A1 | 12/1997 |
| WO | 0181849 A1 | 11/2001 |
| WO | 2006115073 A1 | 11/2006 |
| WO | 2009056446 A1 | 5/2009 |

OTHER PUBLICATIONS

Stone, K.M., "Review of Literature on Heat Transfer Enhancement in Compact Heat Exchangers," ACRC TR-105, Air Conditioning and Refrigeration Center, University of Illinois, Aug. 1996, 39 pages.
Yang, T. L. et al., "Forced Heat Convection of Wavy Fin Channel," Journal of Thermal Science and Technology, vol. 3, No. 2, 2008, pp. 342-354.
Patent Examination Report No. 1 for Australian Patent Application No. 2010273345, issued Nov. 1, 2012, 3 pages.
Patent Examination Report No. 1 for Australian Patent Application No. 2010273997, issued Nov. 16, 2012, 3 pages.
Patent Examination Report No. 2 for Australian Patent Application No. 2010273997, issued Jul. 17, 2013, 3 pages.
Patent Examination Report No. 3 for Australian Patent Application No. 2010273997, issued Oct. 4, 2013, 3 pages.
Patent Examination Report No. 1 for Australian Patent Application No. 2010-303747, issued Mar. 12, 2013, 3 pages.
Examiner's Report for Canadian Patent Application No. 2,766,917, issued Mar. 26, 2012, 2 pages.
Office Action for Canadian Patent Application No. 2,766,917, issued Mar. 21, 2013, 4 pages.
Office Action for Canadian Patent Application No. 2,766,917, issued Apr. 23, 2014, 2 pages.
Office Action for Canadian Patent Application No. 2,767,174, issued Jun. 3, 2013, 3 pages.
Office Action for Canadian Patent Application No. 2,767,174, issued Mar. 6, 2014, 2 pages.
Office Action for Canadian Patent Application No. 2,774,682, mailed Sep. 9, 2013, 2 pages.
Second Office Action for Chinese Patent Application No. 201080031821.1, issued Nov. 15, 2013, 13 pages.
First Office Action for Chinese Patent Application No. 201080032268.3, issued Dec. 24, 2013, 8 pages (No Translation).
Second Office Action for Chinese Patent Application No. 201080032268.3, issued Oct. 24, 2014, 17 pages.
Office Action for Chinese Patent Application No. 201080045277.6, issued Sep. 26, 2013, 5 pages (No Translation).
Notification of Reason for Refusal for Japanese Patent Application No. 2012-520769, mailed Mar. 5, 2014, 10 pages.
Office Action for Japanese Patent Application No. 2012-520821, mailed May 14, 2014, 6 pages.
Final Rejection for Japanese Patent Application No. 2012-520821, mailed Feb. 9, 2015, 4 pages.
Notification of Reason for Refusal for Japanese Patent Application No. 2012-533215, issued Sep. 26, 2013, 5 pages.
Notification of Reason for Refusal for Japanese Patent Application No. 2012-533215, issued Jun. 27, 2014, 12 pages.
Office Action for Korean Patent Application No. 10-2012-7003687, issued May 31, 2013, 7 pages.
Office Action for Korean Patent Application No. 10-2012-7003687, issued Feb. 27, 2014, 7 pages.
Decision of Refusal for Korean Patent Application No. 10-2012-7003687, issued Dec. 26, 2014, 5 pages.
First Office Action for Korean Patent Application No. 10-2015-7007662, mailed May 12, 2015, 8 pages.
Office Action for Korean Patent Application No. 10-2012-7011568, issued Oct. 21, 2013, 8 pages.
International Search Report and Written Opinion for PCT/US2010/042079, mailed Mar. 23, 2011, 14 pages.
International Preliminary Report on Patentability for PCT/US2010/042079, mailed Jan. 24, 2012, 19 pages.
International Search Report for PCT/US2010/042333, mailed Jan. 25, 2012, 8 pages.
International Preliminary Report on Patentability for PCT/US2010/042333, mailed Feb. 9, 2012, 7 pages.
Examination Report for European Patent Application No. 10 740 788.4, mailed May 20, 2015, 4 pages.
International Search Report and Written Opinion for PCT/US2010/050711, mailed Jul. 1, 2011, 15 pages.
Written Opinion for PCT/US2010/050711, mailed Nov. 18, 2011, 6 pages.
International Preliminary Report on Patentability for PCT/US2010/050711, mailed Jan. 27, 2012, 17 pages.
Non-Final Office Action for U.S. Appl. No. 12/484,542, mailed Apr. 5, 2012, 6 pages.
Non-Final Office Action for U.S. Appl. No. 12/484,542, mailed Nov. 19, 2012, 15 pages.
Notice of Allowance for U.S. Appl. No. 12/484,542, mailed Mar. 22, 2013, 8 pages.
Restriction Requirement for U.S. Appl. No. 12/573,982, mailed Jun. 6, 2012, 6 pages.
Non-Final Office Action for U.S. Appl. No. 12/573,982, mailed Sep. 4, 2012, 13 pages.
Final Office Action for U.S. Appl. No. 12/573,982, mailed Mar. 1, 2013, 16 pages.
Advisory Action for U.S. Appl. No. 12/573,982, mailed May 15, 2013, 3 pages.
Non-Final Office Action for U.S. Appl. No. 12/573,982, mailed Jul. 18, 2013, 15 pages.
Final Office Action for U.S. Appl. No. 12/573,982, mailed Dec. 5, 2013, 15 pages.
Examiner's Answer for U.S. Appl. No. 12/573,982, mailed Aug. 20, 2014, 19 pages.
Non-Final Office Action for U.S. Appl. No. 12/573,982, mailed Jan. 9, 2015, 13 pages.
Final Office Action for U.S. Appl. No. 12/573,982, mailed Aug. 24, 2015, 11 pages.
Non-Final Office Action for U.S. Appl. No. 12/628,594, mailed Sep. 24, 2012, 9 pages.
Examiner's Answer for U.S. Appl. No. 12/628,594, mailed Oct. 24, 2013, 12 pages.
Restriction Requirement for U.S. Appl. No. 12/690,373, mailed Apr. 18, 2013, 8 pages.
Non-Final Office Action for U.S. Appl. No. 12/690,373, mailed Aug. 7, 2013, 11 pages.
Final Office Action for U.S. Appl. No. 12/690,373, mailed Jan. 30, 2014, 12 pages.
Non-Final Office Action for U.S. Appl. No. 12/690,373, mailed Sep. 12, 2014, 12 pages.
Final Office Action for U.S. Appl. No. 12/690,373, mailed Apr. 30, 2015, 11 pages.
Restriction Requirement for U.S. Appl. No. 12/836,688, mailed Jul. 31, 2013, 9 pages.

(56) References Cited

OTHER PUBLICATIONS

Restriction Requirement and Interview Summary for U.S. Appl. No. 12/836,688, mailed Aug. 23, 2013, 11 pages.
Non-Final Office Action for U.S. Appl. No. 12/836,688, mailed Nov. 6, 2013, 15 pages.
Non-Final Office Action for U.S. Appl. No. 12/836,688, mailed Dec. 5, 2014, 14 pages.
Final Office Action for U.S. Appl. No. 12/836,688, mailed Jun. 5, 2015, 14 pages.
Advisory Action and Applicant-Initiated Interview Summary for U.S. Appl. No. 12/836,688, mailed Sep. 11, 2015, 6 pages.
Non-Final Office Action for U.S. Appl. No. 12/838,114, mailed Apr. 10, 2013, 13 pages.
Final Office Action for U.S. Appl. No. 12/838,114, mailed Aug. 8, 2013, 15 pages.
Non-Final Office Action for U.S. Appl. No. 13/301,252, mailed Jul. 11, 2014, 9 pages.
Final Office Action for U.S. Appl. No. 13/301,252, mailed Sep. 8, 2014, 9 pages.
Non-Final Office Action for U.S. Appl. No. 13/301,252, mailed Apr. 29, 2015, 11 pages.
Notice of Allowance for U.S. Appl. No. 13/301,252, mailed Sep. 30, 2015, 10 pages.
Reasons for Decision of Rejection for Korean Divisional Patent Application No. 10-2015-7007662, mailed Apr. 28, 2016, 5 pages.
Decision on Appeal for U.S. Appl. No. 12/628,594, mailed Apr. 19, 2016, 6 pages.
Applicant-Initiated Interview Summary for U.S. Appl. No. 12/836,688, mailed Mar. 9, 2016, 4 pages.
Non-Final Office Action for U.S. Appl. No. 12/573,982, mailed Dec. 18, 2015, 10 pages.
Non-Final Office Action for U.S. Appl. No. 12/836,688, mailed Dec. 14, 2015, 8 pages.
Third Office Action for Chinese Patent Application No. 201080032268.3, issued Nov. 23, 2015, 4 pages.
Notice of Reasons for Rejection for Japanese Patent Application No. 2015-037591, mailed Dec. 11, 2015, 17 pages.
Reasons for Decision of Rejection for Korean Divisional Patent Application No. 10-2015-7007662, mailed Dec. 24, 2015, 5 pages.
First Office Action for Korean Patent Application No. 10-2012-7003688, mailed Aug. 31, 2016, 12 pages.
Examination Report for European Patent Application No. 10763940.3, mailed Oct. 4, 2016, 5 pages.
Non-Final Office Action for U.S. Appl. No. 12/628,594, mailed Oct. 26, 2016, 11 pages.
Non-Final Office Action for U.S. Appl. No. 12/838,114, mailed Nov. 3, 2016, 16 pages.
Decision of Rejection for Japanese Patent Application No. 2015-037591, mailed Aug. 23, 2016, 13 pages.
Notice of Allowance for U.S. Appl. No. 12/836,688, mailed Jun. 22, 2016, 8 pages.
Decision on Appeal for U.S. Appl. No. 12/838,114, mailed Aug. 10, 2016, 6 pages.
Pretrial Report for Japanese Patent Application No. 2015-037591, mailed Jan. 31, 2017, 6 pages.
Final Office Action for U.S. Appl. No. 12/573,982, mailed Jan. 12, 2017, 12 pages.
Final Office Action for U.S. Appl. No. 12/838,114, mailed Mar. 1, 2017, 18 pages.
Final Office Action for U.S. Appl. No. 12/628,594, mailed Apr. 7, 2017, 10 pages.

\* cited by examiner

MANIFOLDING ARRANGEMENT FOR A MODULAR HEAT-EXCHANGE APPARATUS

CROSS REFERENCE TO RELATED APPLICATIONS

This application claims the benefit of U.S. Provisional Patent Application Ser. No. 61/388,881, filed Oct. 1, 2010, entitled "Heat-exchange Apparatus with Pontoon-based Fluid Distribution System," which is incorporated herein by reference.

FIELD OF THE INVENTION

The present invention relates to heat exchangers in general, and, more particularly, to heat exchangers for ocean thermal energy conversion (OTEC) systems.

BACKGROUND OF THE INVENTION

An Ocean Thermal Energy Conversion (OTEC) system generates electrical energy based on a temperature difference between cold seawater deep in the ocean and warm seawater near the ocean surface. Typically, OTEC systems rely upon large, robust heat exchangers that transfer heat between a working fluid and the seawater as part of a Rankine-cycle engine.

In the Rankine cycle, the working fluid is vaporized by absorption of heat from the warm seawater at one or more heat exchangers, configured as evaporators. The vaporized working fluid passes through a turbogenerator to induce it to generate electrical energy. After the vaporized working fluid has passed through the turbogenerator, it is condensed back into liquid form at one or more heat exchangers, configured as condensers. At these condensers, heat from the working fluid is absorbed by cold seawater pumped into the condensers from a depth of 1000 meters or more. The liquefied working fluid is then pumped back to the evaporators to be vaporized again, thus continuing the Rankine cycle.

The evaporators and condensers are sometimes located on a ship or on the deck of an offshore platform, such as platforms used in offshore oil drilling, etc. It is preferable, however, that they are submerged below the water line to reduce platform costs and preserve deck space, among other reasons. In some cases, evaporators or condensers are housed in submerged compartments that are part of the offshore platform itself.

The heat exchangers and pumping systems that feed seawater to them represent some of the largest capital and operational costs of an OTEC installation. As a result, it is highly desirable, if not necessary, that the seawater delivery and pumping systems are cost-effective, minimize parasitic losses, and enable the flow of large volumes of seawater through the heat exchangers.

SUMMARY OF THE INVENTION

The present invention enables OTEC systems that overcome some of the limitations and drawbacks of the prior art. Embodiments of the present invention comprise heat-exchanger modules for use with offshore platforms. Each heat exchanger module comprises a plurality of heat exchangers, and the heat-exchanger modules are dimensioned and arranged to enable flow of seawater through the heat exchangers with little or no pressure drop. An illustrative embodiment of the present invention comprises an offshore platform hull comprising heat-exchanger modules that are mechanically and fluidically coupled with pontoons that comprise seawater plenums that convey seawater to and from each heat-exchanger module.

In the illustrative embodiment, a first heat-exchanger module comprises a first manifold that fluidically couples with first port at a first pontoon. The first port provides seawater to the first manifold. The first manifold has a first channel having a first end that matches the size and shape of the first port to avoid discontinuities that can lead to the development of backpressure or pressure drops. The cross-sectional area of the first channel decreases monotonically to the size of a second channel that distributes the seawater to each of a plurality of heat exchangers. In some embodiments, the first manifold is dimensioned and arranged to substantially equalize the pressure of the seawater received by each of the heat exchangers.

The first heat-exchanger module further comprises a second manifold having a third channel that receives the seawater after it has passed through the plurality of heat exchangers. The third channel provides the received seawater to a fourth channel that is characterized by a cross-section that increases monotonically from that of the third channel to a cross-section that matches a second port at a second pontoon. As a result, the fourth channel smoothly conveys the seawater to the second port with little or no pressure drop or development of backpressure.

An embodiment of the present invention comprises a heat-exchanger module comprising a first manifold, the first manifold comprising: a first channel, the first channel dimensioned and arranged to fluidically couple with a first pontoon that conveys a first fluid; a second channel, the second channel dimensioned and arranged to fluidically couple with each of a plurality of heat exchangers; and a first interface region, the first interface region fluidically coupling the first channel and the second channel.

DETAILED DESCRIPTION

Figure 1:
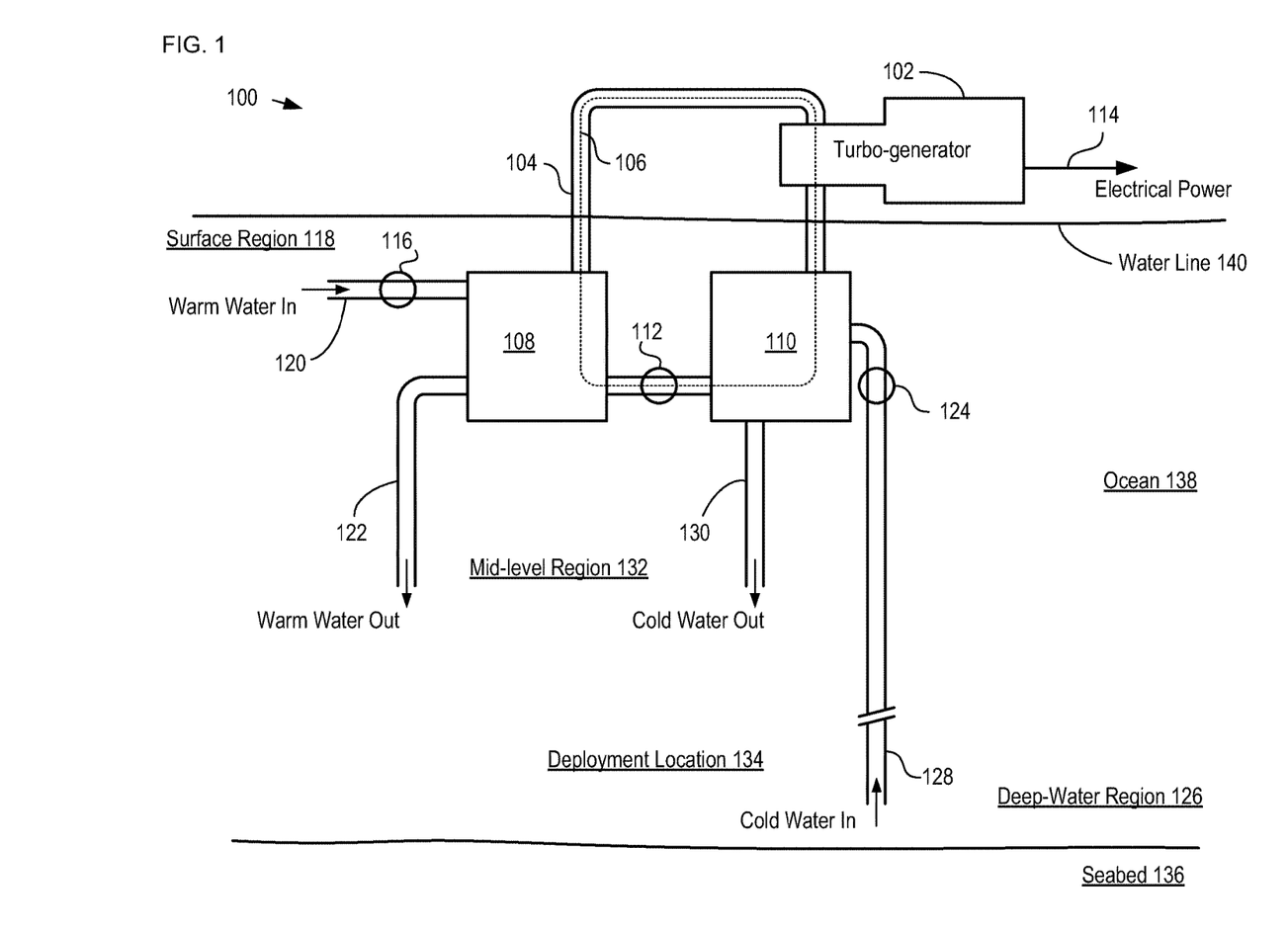
FIG. 1 depicts a schematic diagram of an OTEC power generation system in accordance with an illustrative embodiment of the present invention.

FIG. 1 depicts a schematic diagram of an OTEC power generation system in accordance with an illustrative embodiment of the present invention. OTEC system 100 comprises turbogenerator 102, closed-loop conduit 104, evaporator 108, and condenser 110.

OTEC system 100 is deployed in ocean 138 at deployment location 134. Deployment location 134 is typically an offshore location at which the ocean depth is greater than 1000 meters. In some embodiments, OTEC system 100 is deployed in a body of water other than an ocean (e.g., a lake, sea, etc.).

Collectively, turbogenerator 102, closed-loop conduit 104, evaporator 108, condenser 110, and pump 112 compose a Rankine-cycle heat engine that generates electrical energy based on the difference in the temperature of seawater in surface region 118 and the temperature of seawater in deep-water region 126.

Turbogenerator 102 is a conventional turbine-driven generator, typically mounted on an offshore platform. Turbogenerator 102 generates electrical energy in response to a flow of working fluid. Turbogenerator 102 provides the electrical energy it generates on output cable 114.

Closed-loop conduit 104 is a conduit that conveys working fluid 106 through the Rankine-cycle heat engine. Working fluid 106 is ammonia; however, one skilled in the art will recognize that working fluid 106 can be selected as any fluid that evaporates at a temperature below the temperature of the seawater in surface-region 118 and condenses at a temperature above the temperature of the seawater in deep-water region 126 (subject to material compatibility constraints and environmental concerns). Fluids suitable for use as working fluid 106 include, without limitation, ammonia, tetrafluoroethane, dichloromethane, sulfur dioxide, propylene, carbon dioxide and the like.

In the illustrative embodiment, evaporator 108 comprises two heat-exchanger modules, each of which contains a plurality of heat exchangers that are configured to induce evaporation of working fluid 106. In some embodiments, evaporator 108 comprises a single heat-exchanger module. In some embodiments, evaporator 108 comprises more than two heat-exchanger modules.

In typical operation, pump 112 pumps working fluid 106, in liquid form, through closed-loop conduit 104 to evaporator 108.

At evaporator 108, heat from warm seawater from surface-region 118 is absorbed by working fluid 106. The absorbed heat induces working fluid 106 to vaporize. The warm seawater is drawn by pump 116 from surface region 118 into evaporator 108 via conduit 120. In some embodiments, pump 116 is located on the effluent side of evaporator 108 (i.e., pump 116 is fluidically coupled with conduit 122). In a typical OTEC deployment, the seawater in surface region 118 is at a substantially constant temperature of approximately 25 degrees centigrade (subject to weather and sunlight conditions).

After passing through evaporator 108, the now slightly cooler seawater is ejected back into mid-level region 132 of ocean 138 via conduit 122. Mid-level region 132 is typically at a depth of approximately 80-120 meters to avoid reducing the average temperature in surface-water region 118.

The expanding working fluid 106 vapor exits evaporator 108 and is forced through turbogenerator 102. In response, the turbogenerator generates electrical energy, which is provided on output cable 114. After it passes through turbogenerator 102, the vaporized working fluid is conveyed by closed-loop conduit 104 to condenser 110.

In the illustrative embodiment, condenser 110 comprises two heat-exchanger modules, each of which contains a plurality of heat exchangers that are configured to induce condensation of working fluid 106. In some embodiments, condenser 110 comprises a single heat-exchanger module. In some embodiments, condenser 110 comprises more than two heat-exchanger modules.

At condenser 110, cold seawater from deep-level region 126 absorbs heat from the vaporized working fluid. As a result, the working fluid condenses back into liquid form. Pump 124 draws the cold seawater into condenser 110 from deep-water region 126 via conduit 128. In some embodiments, pump 124 is located on the effluent side of condenser 110 (i.e., pump 124 is fluidically coupled with conduit 130). Typically, deep-water region 126 is approximately 1000 meters below the surface of the body of water. At this depth, water remains at a substantially constant temperature of a few degrees centigrade.

After passing through condenser 110, the now slightly warmer water is ejected into mid-level region 132 of ocean 138 via conduit 130 to avoid raising the average water temperature in deep-water region 126.

Condensed working fluid 106 is then pumped back into evaporator 108 (by pump 112), where the working fluid is once again vaporized, thereby continuing the Rankine cycle that drives turbogenerator 102.

One skilled in the art will recognize that the operation of a heat exchanger as an evaporator or condenser is dependent upon the manner in which it is fluidically configured in OTEC system 100.

In some embodiments, OTEC system 100 generates electricity by means of one or more thermoelectric conversion elements, such as solid-state thermoelectric devices, Peltier devices, and the like. In such embodiments, turbogenerator 102 is not required.

Typically, a conventional OTEC system will include many individual heat exchangers, some of which are fluidically connected as evaporators and others fluidically connected as condensers. The most common types used in prior art OTEC installations are shell-and-tube heat exchangers and plate-and-fin heat exchangers.

It is necessary to distribute large amounts of seawater through the many heat exchangers in order to enable generation of appreciable amounts of electrical energy. Distributing warm and cold seawater to each of the many heat exchangers in a conventional OTEC system can be quite complicated, however. Routing numerous conduits to and from the heat exchangers, as well as making or breaking fluidic connections at depth, is difficult and dangerous. Further, these conduits represent a reliability concern.

In addition, pumping large volumes of seawater through the heat exchangers leads to one of the largest parasitic losses in a typical OTEC system. The pressure drop through the feed conduits and in the heat exchangers, themselves, necessitates the use of higher pump pressure and subsequently greater energy consumption.

These drawbacks increase both the capital costs and the operational costs of a conventional OTEC system. As a result, the cost-benefits associated with power generation via OTEC are reduced by way of the present invention.

Figure 2:
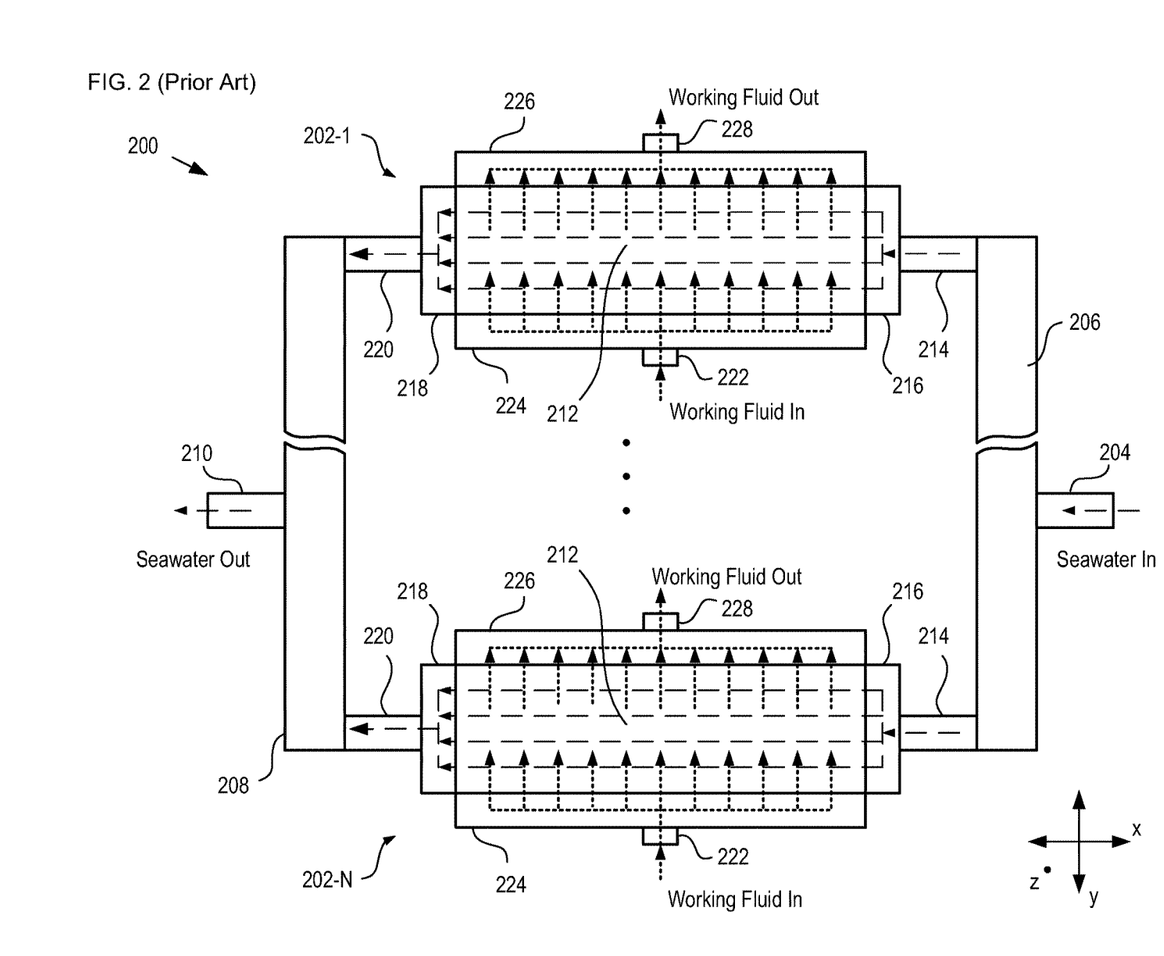
FIG. 2 depicts a schematic diagram of an exemplary parallel heat exchanger assembly based on conventional plate-fin heat exchangers in accordance with the prior art.

FIG. 2 depicts a schematic diagram of an exemplary parallel heat exchanger assembly based on conventional plate-fin heat exchangers in accordance with the prior art. Heat exchanger assembly 200 comprises heat exchangers 202-1 through 202-N, inlet 204, input manifold 206, output manifold 208, and outlet 210. Heat exchanger assembly 200 represents an arrangement of heat exchangers configured as either condensers or evaporators.

Each of heat exchangers 202-1 through 202-N (referred to, collectively, as heat exchangers 202) comprises core 212, conduits 214 and 220, inlet manifold 216, output manifold 218, working-fluid inlet 222, working-fluid manifolds 224 and 226, and working-fluid outlet 228.

Each of heat exchangers 202 is a conventional plate-fin heat exchanger whose core 212 comprises a cross-flow arrangement of flow-channels for conveying seawater along the x-direction and working fluid along the y-direction.

In operation, seawater is pumped into input manifold 206 via inlet 204. Each heat exchanger receives seawater from input manifold 206 via conduit 214, which provides it to inlet manifold 216. Inlet manifold 216 distributes the incoming seawater into the flow channels of core 212 that are aligned with the x-direction. After passing through core 212, the seawater is collected at output manifold 218, which provides it to conduit 220. Conduit 220 channels the outgoing seawater to output manifold 208, which collects it and provides it to outlet 210.

In similar fashion, each of heat exchangers 202 receives working fluid from working-fluid inlet 222 via working-fluid manifold 224. Working-fluid manifold 224 distributes the working fluid to into the flow channels of core 212 that are aligned with the y-direction. After passing though core 212, working-fluid manifold 226 collects the working fluid and provides it to working-fluid outlet 228. For each of heat exchangers 202, working-fluid inlet 222 and working-fluid outlet 228 are fluidically coupled with a closed-loop conduit, in similar fashion to evaporator 108 and condenser 110 of system 100 described above and with respect to FIG. 1.

Some prior-art OTEC installations mount individual heat exchangers and their associated fluid-flow systems above the waterline (on the offshore-platform deck or another location) so that they are readily accessible to platform personnel. In such installations, the conduit systems used to feed the fluids through the heat exchangers are normally limited to relatively small cross-sections due to the space and weight restrictions above the waterline, to enable the use of readily available materials, and to enable easy installation, repair, and replacement of components. In addition, because the available space above the water line is limited, it is often necessary to run the conduit systems along complex routes.

Unfortunately, smaller conduits require higher pump pressure to force fluids through the conduit systems. In addition, complex routing typically adds discontinuities, bends, abrupt size changes, etc, which lead to undesirable pressure drops that must also be overcome by increased pump pressure.

Figure 3:
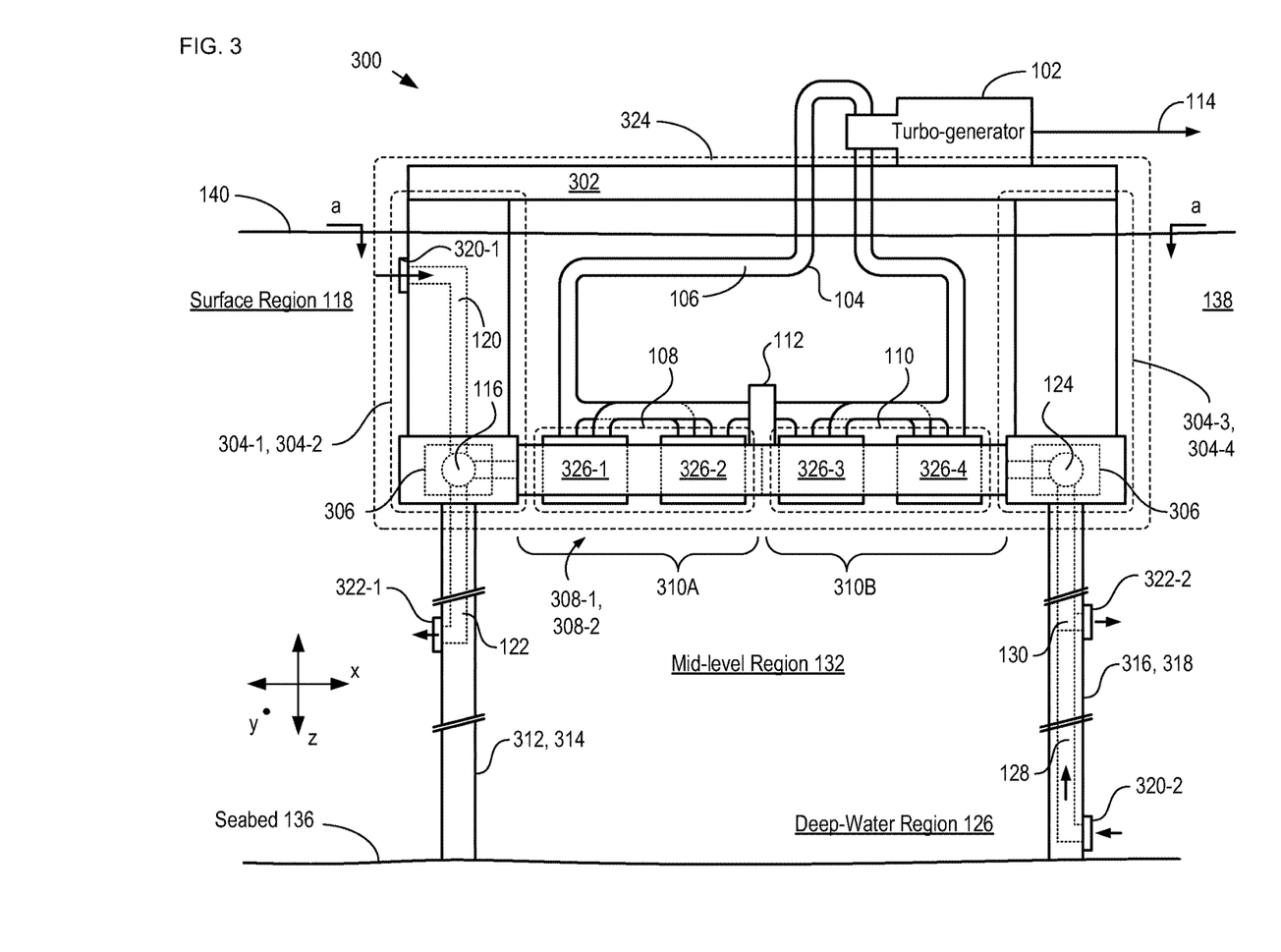
FIG. 3 depicts a schematic diagram of a side-view of an OTEC platform in accordance with the illustrative embodiment of the present invention.

FIG. 3 depicts a schematic diagram of a side-view of an OTEC platform in accordance with the illustrative embodiment of the present invention. Platform 300 is a tension-leg platform that comprises hull 324 and tension legs 312, 314, 316, and 318. In some embodiments, offshore platform 300 is an offshore platform other than a tension-leg platform, such as a semi-submersible, spar, ship, jack-up offshore platform, grazing plant, and the like.

Hull 324 comprises deck 302, caissons 304, and pontoons 306 and 308-1 and 308-2. Each of the heat-exchanger modules that make up evaporator 108 and condenser 110 are integrated into hull 324 between pontoons 308. Hull 324 is typically partially buoyant.

Tension legs 312, 314, 316, and 318 are rigid members that are anchored to seabed 136 at deployment location 134 to support hull 324 above water line 140. The tension legs are anchored to seabed 136 via pilings and anchors (not shown for clarity). Some of the tension legs (i.e., tension legs 314, 316, and 318) comprise conduits for conveying seawater to/from pontoons 308-1 and 308-2, as described below and with respect to FIG. 4.

Deck 302 is a platform suitable for supporting, among other things, turbogenerator 102, energy storage systems, operational personnel, and living quarters above the surface of ocean 138. Deck 302 is supported above water line 140 by caissons 304-1 through 304-4 and pontoons 306 and 308-1 and 308-2.

Each of caissons 304-1 through 304-4 has a buoyancy and water plane area suitable for supporting deck 302 above the ocean surface.

Pontoons 306 are conventional, horizontally oriented pontoons typically used to provide buoyancy and/or ballasting to an offshore platform. Pontoons 306 augment the buoyancy of caissons 304. In some embodiments, the buoyancy of one or more of pontoons 306 is controllable.

Pontoons 308-1 and 308-2 are horizontally oriented pontoons, each comprising infrastructure for conveying seawater to/from evaporator 108 and condenser 110. Pontoon 308-1 is mounted to platform 300 between caissons 304-1 and 304-3. Pontoon 308-2 is mounted to platform 300 between caissons 304-2 and 304-4. Pontoons 308-1 and 308-2 are described in more detail below and with respect to FIG. 4.

Evaporator 108 comprises heat-exchanger modules 326-1 and 326-2. In similar fashion, condenser 110 comprises heat-exchanger modules 326-3 and 326-4. Each of heat-exchanger modules 326-1 through 326-4 (referred to collectively as heat-exchanger modules 326) comprises a plurality of heat exchangers, as described below and with respect to FIG. 5. Each heat-exchanger module 326 is mechanically and fluidically coupled with pontoons 308-1 and 308-2 below water line 140.

By locating heat-exchanger modules 326 below water line 140, they are more accessible to cold and/or warm water flows, which can reduce overall system cost. It also avoids the space constraints placed on above-water heat exchanger installations, enabling a more simply routed seawater distribution system based on larger conduits and other components. In addition, locating these systems below the water line makes it possible to use each of pontoons 308 as a "seawater plenum." As a result, pontoon 308-1 functions as a plenum that acts as a seawater source and pontoon 308-2 functions as a plenum that acts as a seawater sink for each individual heat-exchanger module included in the evaporator and condenser, as discussed below and with respect to FIG. 4.

It should be clear to one skilled in the art that evaporator and condenser modules may alternatively be coupled to vertically oriented caissons instead of the horizontally oriented pontoons, or if coupled to the pontoons, that the pontoons may be oriented at a non-horizontal angle.

Figure 4:
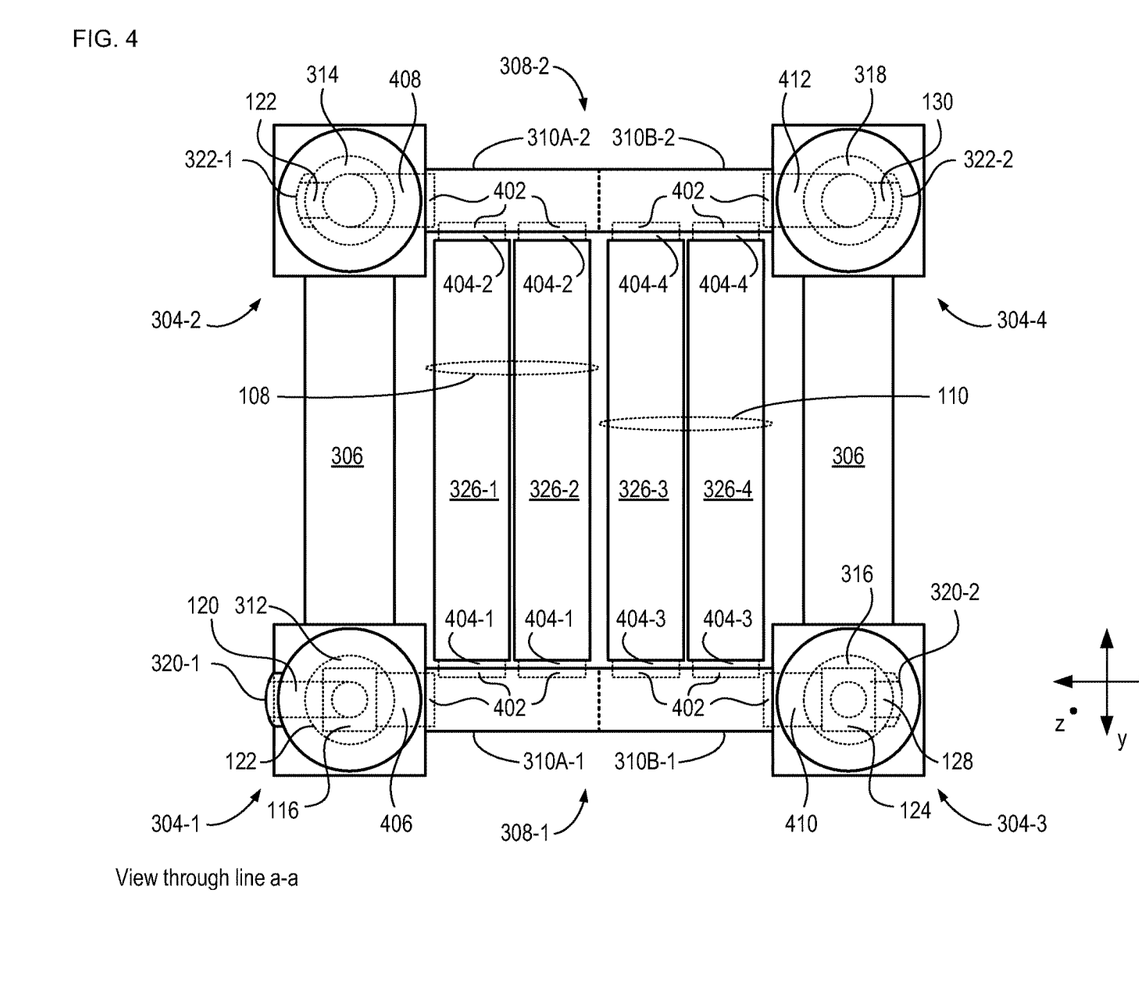
FIG. 4 depicts a schematic diagram of a top-view of an OTEC platform in accordance with the illustrative embodiment of the present invention.

FIG. 4 depicts a schematic diagram of a top-view of an OTEC platform in accordance with the illustrative embodiment of the present invention. FIG. 4 depicts the view of platform 300 taken through line a-a shown in FIG. 3. FIG. 4 is described herein with continuing reference to FIG. 3.

Each of pontoons 308-1 and 308-2 comprises pontoon sections 310A and 310B. These pontoon sections comprise large chambers for seawater that act as seawater plenums for the heat-exchanger modules of evaporator 108 and condenser 110. Pontoon sections 310A and 310B are fluidically decoupled from one another. In some embodiments, pontoon sections 310A and 310B are thermally insulated to mitigate thermal conduction between each other, as well as between them and the surrounding seawater.

Pontoon sections 310A-1 and 310A-2 are fluidically coupled with evaporator 108 at ports 404-1 and 404-2, respectively. Pontoon sections 310B-1 and 310B-2 are fluidically coupled with condenser 110 at ports 404-3 and 404-4, respectively.

In some embodiments, pontoons 308 are not sectioned into fluidically decoupled pontoon sections. In such embodiments, evaporator 108 and condenser 110 are fluidically coupled to different pontoons. In some embodiments, at least one heat exchanger of evaporator 108 or condenser 110 is fluidically coupled between the pontoon sections of the same pontoon, wherein the different pontoon sections are fluidically coupled to different regions of the body of water (e.g., surface region 118 and mid-level region 132).

One skilled in the art will recognize, after reading this specification, that the present invention is not limited to horizontally oriented heat-exchanger modules that are fluidically coupled with fluid sources/sinks located in pontoons. As a result, in some embodiments, at least one heat exchanger of evaporator 108 or condenser 110 is fluidically coupled to a seawater source or sink that is not a pontoon.

Caisson 304-1 comprises a fluidic distribution system for providing warm seawater to the heat-exchanger modules of evaporator 108. Specifically, caisson 304-1 comprises conduit 120, port 406 pump 116, and inlet 320-1. In some embodiments, pump 116 is located within the caisson and is accessible for service through the top of the caisson.

Pump 116 draws warm seawater from surface region 118 to port 406 via inlet 320-1 and conduit 120. Typically, inlets 320 include screens or other filters to mitigate fouling due to the intake of sea animals, vegetation, flotsam, etc. Conduit 120 conveys the warm seawater from inlet 320-1 to port 406.

Pontoon section 310A-1 conveys the warm seawater from port 406 to each of heat-exchanger modules 326-1 and 326-2 via ports 404-1. Each pontoon section 310 of pontoons 308-1 and 308-2 includes seawater plenums that source or sink seawater to/from heat-exchanger modules 326 with little or no pressure drop. Further, at points where a plenum mates to a port (e.g., wherein pontoon section 310A-1 mates to ports 406 and 404-1), each junction is characterized by a substantially smooth transition wherein the opening in the pontoon section substantially matches the size and shape of its mating element.

At each of ports 404-1, heat-exchanger modules 326-1 and 326-2 receive the warm seawater and thermally couple it (at their respective heat exchangers) with working fluid 106. The heat exchangers included in heat-exchanger modules 326-1 and 326-2 are fluidically coupled with closed-loop conduit 104 via working-fluid manifolds and flexible conduits (not shown for clarity). As discussed above and with respect to FIG. 1, at each heat-exchanger module in evaporator 108, working fluid 106 absorbs some of the heat of the warm seawater and vaporizes.

After passing through heat-exchanger modules 326-1 and 326-2, the now slightly cooler seawater is received by pontoon section 310A-2 via ports 404-2. Pontoon section 310A-2 conveys the seawater to port 408 at caisson 304-2.

Caisson 304-2 conveys the seawater to conduit 122, which is integrated into tension leg 314. Conduit 122 carries the seawater from port 408 to outlet 322-1, which discharges the seawater into ocean 138 at mid-level region 132.

In similar fashion to caisson 304-1, caisson 304-3 comprises a fluidic distribution system for providing cold seawater to the heat-exchanger modules of condenser 110. Specifically, caisson 304-3 comprises conduit 128, port 410, pump 124, and inlet 320-2. In some embodiments, pump 124 is located within the caisson and is accessible for service through the top of the caisson.

Pump 124 draws cold seawater to port 410 from deepwater region 126 through inlet 320-2. The cold seawater is drawn to port 410 through conduit 128, which is integrated into tension leg 316. Pontoon section 310B-1 conveys the cold seawater from port 410 to each of heat-exchanger modules 326-3 and 326-4 via ports 404-3.

At each of ports 404-3, heat-exchanger modules 326-3 and 326-4 receive the cold seawater and thermally couple it (at their respective heat exchangers) with vaporized working fluid 106. The heat exchangers included in heat-exchanger modules 326-3 and 326-4 are fluidically coupled with closed-loop conduit 104 via working-fluid manifolds and flexible conduits (not shown for clarity). As discussed above and with respect to FIG. 1, at each heat-exchanger module in condenser 110, the cold seawater absorbs some of the heat of vaporized working fluid 110, thereby inducing the working fluid to condense back into a liquid state.

After passing through heat-exchanger modules 326-3 and 326-4, the now slightly warmer seawater is received by pontoon section 310B-2 at each of ports 404-4. Pontoon section 310B-2 conveys the seawater to port 412 at caisson 304-4.

Caisson 304-4 conveys the seawater to conduit 130, which is integrated into tension leg 318. The seawater is conveyed from port 412 through conduit 130 to outlet 322-2, which is located at mid-level region 132. At outlet 322-2, the seawater is discharged into ocean 138.

It should be noted that in some embodiments, each of ports 404-1 through 404-4 and each of ports 406 through 412 is terminated by a valve 402. Valves 402 enable removal of pontoons and/or heat-exchanger modules from OTEC system 100 without disrupting operation of other heat-exchanger modules in the system. Valves suitable for use in valves 402 include, without limitation, ball valves, rotary valves, sluice gates, iris valves, and the like.

Although in the illustrative embodiment conduits 122, 128, and 130 are integrated into their respective tension legs, it will be clear to one skilled in the art, after reading this specification, how to make and use alternative embodiments of the present invention wherein at least one conduit is a separate conduit that is supported outside of a tension leg. In some embodiments, at least one conduit hangs freely from a platform. In such embodiments, it is preferable to attach weights (e.g., clump weights) to the based of the conduits.

In some embodiments, the pumps for drawing the seawater into the pontoons are located within the pontoons themselves. This can reduce maintenance complexity by providing easier access to the pumps.

Since each of evaporator 108 and condenser 110 comprises a plurality of heat-exchanger modules, each of pontoons 308-1 and 308-2 comprises multiple valves 402 so that individual modules can be removed from service without significantly disrupting ongoing operation of other modules. As a result, each individual module of evaporator 108 and condenser 110 can be disconnected from pontoons 308 (mechanically and fluidically) and brought to the surface of ocean 138. Once at the surface, a module can easily be replaced, repaired, refurbished, or exchanged for a heat exchanger having a different heat transfer capacity.

Figure 5:
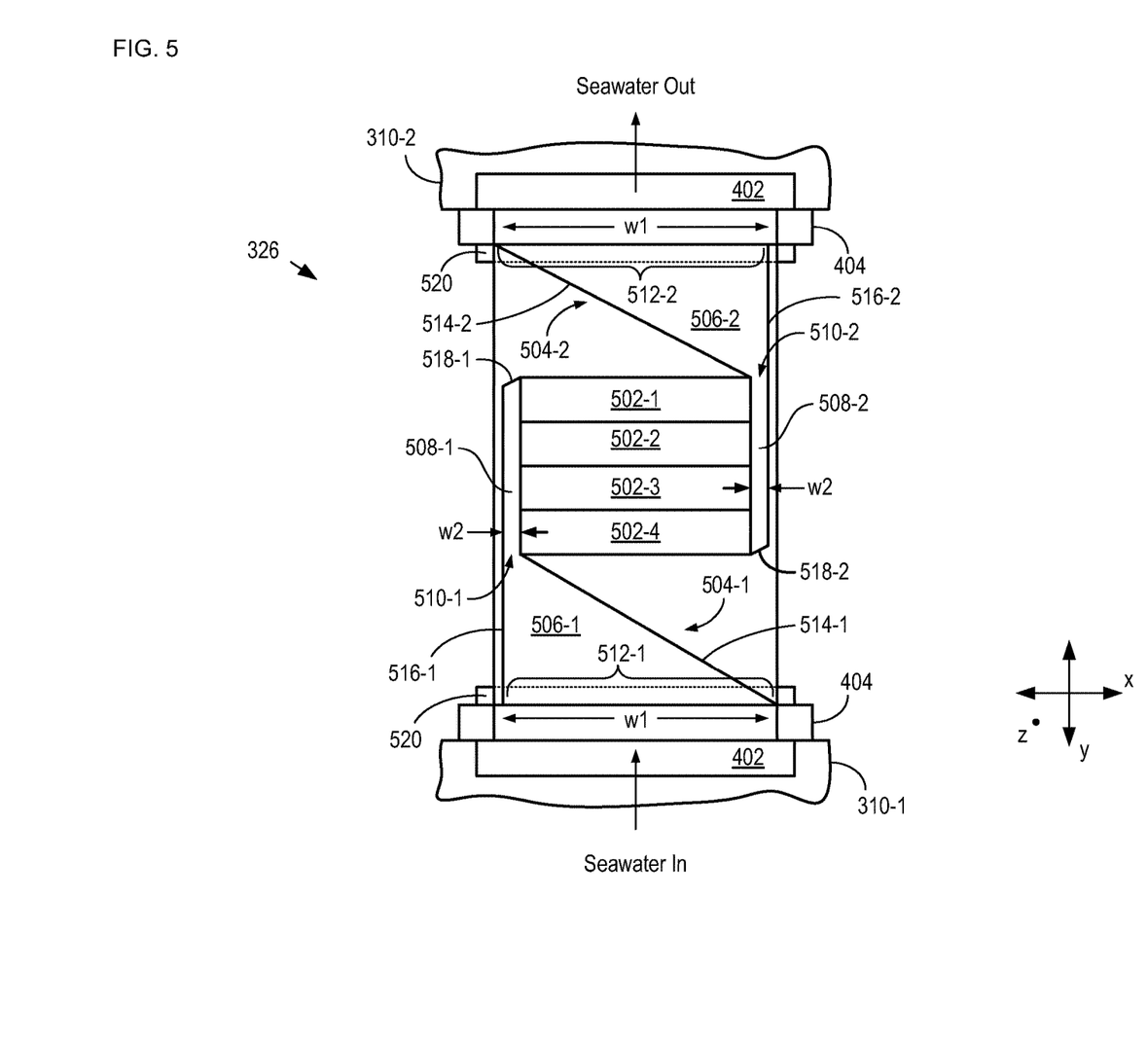
FIG. 5 depicts a schematic drawing of a cross-sectional view of a heat-exchanger module in accordance with the illustrative embodiment of the present invention.

FIG. 5 depicts a schematic drawing of a cross-sectional view of a heat-exchanger module in accordance with the illustrative embodiment of the present invention. Heat exchanger module 326 is representative of either of evaporator 108 and condenser 110. FIG. 5 is described with continuing reference to FIG. 4.

Heat exchanger module 326 comprises heat exchangers 502-1 through 502-4, manifolds 504-1 and 504-2, and flanges 520.

Each of heat exchangers 502-1 through 502-4 (referred to, collectively, as heat exchangers 502) is a plate-fin heat exchanger suitable for transferring heat between seawater and working fluid 106. Although heat-exchanger module 326 comprises four heat exchangers, it will be clear to one skilled in the art, after reading this specification, how to specify, make, and use alternative embodiments of the present invention wherein a heat-exchanger module comprises any practical number of heat exchangers. In some embodiments, heat-exchanger module 326 comprises a single heat exchanger 502.

One skilled in the art will recognize that the present invention is suitable for use with many types of heat exchangers, such as tube-shell heat exchangers, plate-frame heat exchangers, etc. One skilled in the art will also recognize that, in some applications, certain types of heat exchangers are better suited for operation as evaporators and certain types of heat exchangers are better suited for operation as condensers. In some embodiments of the present invention, therefore, at least one of heat exchangers 326 is a type of heat exchanger other than a plate-fin heat exchanger.

Manifolds 504-1 and 504-2 are substantially identical manifolds for conveying seawater through heat-exchanger module 326. Each manifolds 504 comprises channels 506 and 508, which are fluidically coupled at interface region 510.

Manifold 504-1 receives seawater from pontoon section 310-1 via a first port 404 and first valve 402. Manifold 504-1 provides the received seawater to each of heat exchangers 502. Manifold 504-2 receives the seawater at channel 508-2, after it has passed through heat exchangers 502, and conveys it to channel 506-2 through interface region 510-2. Channel 506-2 then channels the seawater to pontoon section 310-2 via a second port 404 and second valve 402. Manifolds 504-1 and 504-2 are dimensioned and arranged to induce little or no pressure drop in the flow of seawater from pontoon section 310-1 to pontoon section 310-2 through heat exchangers 502.

Channel 506 has a substantially uniform height along the z-direction. The width of channel 506, however, decreases monotonically along the y-direction from w1 at first end 512 to w2 interface region 510. The cross-sectional area of channel 506, therefore, also decreases monotonically from first end 512 to w2 interface region 510. It should be noted that the cross-sectional area of channel 506 at first end 512 substantially matches the opening of port 404 such that little or no restriction on the flow of seawater between pontoon section 310 and channel 506 is introduced at first end 512.

The width of channel 506 along the y-direction is defined by the separation between turning vane 514 and sidewall 516. Turning vane is a substantially straight wall that angles from first end 512 to interface region 510. In some embodiments, turning vane 514 has a shape other than straight, such as curved or irregular. In accordance with the present invention, however, in each embodiment, turning vane 514 introduces no discontinuities or voids into channel 506 that could serve to create pressure drops in the flow of seawater through the channel.

Channel 508 is a channel of uniform width, w2. Channel 508 provides the seawater received at interface region 510 to each of heat exchangers 502. In some embodiments, channel 508 is shaped such that the seawater flow to or from each heat exchanger 502 is substantially equal across the heat exchangers. In some embodiments, channel 508 has a width that is non-uniform.

Channel 508 is terminated by turning vane 518, which facilitates the smooth flow of seawater into or out of heat exchangers 502 without development of significant back-pressure.

Flanges 520 are conventional flanges that secure heat-exchanger module 326 to pontoon sections 310-1 and 310-2. One skilled in the art will recognize that flanges 520 represent only one possible means of securing the heat-exchanger module to the pontoon sections.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A heat-exchanger module comprising:
a plurality of heat exchangers configured to convey a first fluid;
a first manifold, the first manifold comprising:
an inlet port having a first cross-sectional area;
a first channel having a first end with the first cross-sectional area coupled to the inlet port and a second end with a second cross-sectional area smaller than the first cross-sectional area, the first channel comprising:
a first sidewall that extends perpendicularly with respect to the first cross-sectional area of the first end of the first channel and the second cross-sectional area of the second end of the first channel and parallel with respect to a direction of fluid flow from the first end to the second end of the first channel; and
a first turning vane opposite the first sidewall that extends from the first end to the second end of the first channel such that a cross-sectional area that is perpendicular to the first sidewall reduces monotonically in the direction of fluid flow from the first cross-sectional area at the first end of the first channel to the second cross-sectional area at the second end of the first channel, wherein the first end of the first channel is coupled to the inlet port of the heat-exchanger module; and
a second channel dimensioned and arranged to fluidically couple with each of the plurality of heat exchangers, the second channel fluidically coupled with the first channel at the second end of the first channel, the second channel comprising:
a second sidewall coplanar with the first sidewall of the first channel; and
a third sidewall opposite the second sidewall and coupled to the first turning vane of the first channel, the third sidewall forming a plurality of apertures configured to fluidically couple the second channel with the plurality of heat exchangers and
a second manifold comprising:
an outlet port having a third cross-sectional area;
a third channel having a first end with a third cross-sectional area coupled to the outlet port and a second end with a fourth cross-sectional area smaller than the third cross-sectional area, the third channel comprising:
a fourth sidewall that extends perpendicularly with respect to the third cross-sectional area of the first end of the third channel and the fourth cross-sectional area of the second end of the third channel and parallel with respect to a direction of fluid flow from the second end to the first end of the third channel; and
a second turning vane opposite the fourth sidewall that extends from the first end to the second end of the third channel such that a cross-sectional area that is perpendicular to the fourth sidewall increases monotonically in the direction of fluid flow from the fourth cross-sectional area at the second end of the third channel to the third cross-sectional area at the first end of the third channel, wherein the first turning vane is parallel to the second turning vane; and
a fourth channel dimensioned and arranged to fluidically couple with each of the plurality of heat exchangers, the fourth channel fluidically coupled with the third channel at the second end, the fourth channel comprising:
a fifth sidewall coplanar with the fourth sidewall of the third channel; and
a sixth sidewall opposite the fifth sidewall and coupled to the second turning vane of the third channel, the sixth sidewall forming a plurality of apertures configured to fluidically couple the fourth channel with the plurality of heat exchangers.

2. The heat-exchanger module of claim 1 further comprising a first pontoon, the first pontoon fluidically coupled to the inlet port of the first manifold, the first pontoon configured to convey the first fluid between the first pontoon and the first channel.

3. The heat-exchanger module of claim 1 wherein the first channel is dimensioned and arranged to fluidically couple with a first pontoon that conveys a first fluid, and wherein the third channel is dimensioned and arranged to fluidically couple with a second pontoon that conveys the first fluid.

4. The heat-exchanger module of claim 1 wherein the first cross-sectional area reduces in linear fashion.

5. The heat-exchanger module of claim 1 wherein the first cross-sectional area reduces in non-linear fashion.

6. The heat-exchanger module of claim 1, wherein the second channel is fluidically coupled with each of a plurality of fluid inlets of the plurality of heat exchangers, each fluid inlet of the plurality of fluid inlets configured to deliver a fluid to a separate heat exchanger of the plurality of heat exchangers, each separate heat exchanger comprising one of a plate-fin heat exchanger, a tube-shell heat exchanger, or a plate-frame heat exchanger.

7. The heat-exchanger module of claim 1, wherein:
each of the plurality of heat exchangers extends between the second channel and the fourth channel in a direction perpendicular to the first sidewall of the first channel and the fourth sidewall of the third channel.

8. A heat-exchanger module comprising:
a first pontoon configured to convey a first fluid;
a plurality of heat exchangers configured to convey the first fluid;
a second pontoon configured to convey the first fluid;
a first manifold, comprising:
a first channel comprising:
an inlet end that is fluidically coupled to the first pontoon via a first port having a first width;
a first sidewall that extends perpendicularly with respect to the inlet end and parallel with respect to a direction of fluid flow through the first manifold; and
a first turning vane opposite the first sidewall that extends from the inlet end to a first interface region, the first interface region having a second width that is smaller than the first width, such that a cross-sectional area that is perpendicular to the first sidewall of the first channel monotonically reduces from the inlet end to the first interface region;
a second channel fluidically coupled between the first interface region and each of the plurality of heat exchangers, the second channel comprising: a second sidewall coplanar with the first sidewall of the first channel; and
a third sidewall opposite the second sidewall and coupled to the first turning vane of the first channel, the third sidewall forming a plurality of apertures configured to fluidically couple the second channel with the plurality of heat exchangers; and
a second manifold, comprising:
a third channel comprising:
an outlet end that is fluidically coupled to the second pontoon via a second port having the first width;
a fourth sidewall that extends perpendicularly with respect to the outlet end and parallel with respect to a direction of fluid flow through the second manifold; and
a second turning vane opposite the fourth sidewall that extends from the outlet end to a second interface region, the second interface region having the second width, such that a cross-sectional area that is perpendicular to the fourth sidewall of the third channel monotonically increases from the second interface region to the outlet end, wherein the first turning vane is parallel to the second turning vane;
a fourth channel fluidically coupled between the second interface region and each of the plurality of heat exchangers, the fourth channel comprising:
a fifth sidewall coplanar with the fourth sidewall of the third channel; and
a sixth sidewall opposite the fifth sidewall and coupled to the second turning vane of the third channel, the sixth sidewall forming a plurality of apertures configured to fluidically couple the fourth channel with the plurality of heat exchangers.

9. The heat-exchanger module of claim 8 wherein the first manifold is dimensioned and arranged to provide the first fluid to each of the plurality of heat exchangers at a same pressure and a same temperature.

10. The heat-exchanger module of claim 8 wherein the first port is fluidically coupled with a first pontoon port, wherein the first pontoon comprises the first pontoon port.

11. The heat-exchanger module of claim 8, wherein the first turning vane is configured to direct the flow of the first fluid between the first channel and second channel.

12. The heat-exchanger module of claim 8, wherein the cross-sectional area is rectangular in shape.

13. The heat-exchanger module of claim 8, wherein the plurality of heat exchangers are disposed entirely between a first plane and a second plane, the first plane defined by the first sidewall and the second sidewall, and the second plane defined by the fourth sidewall and the fifth sidewall.

14. A heat-exchanger module comprising:
a first pontoon configured to convey a first fluid; and
a first manifold, comprising:
a first channel comprising:
a first end that is fluidically coupled to the first pontoon via a first port having a first width;
a sidewall that extends perpendicularly with respect to the first end of the first channel and parallel with respect to a direction of fluid flow; and
a first turning vane that extends from the first end of the first channel to a first interface region at a second end of the first channel, the first interface region having a second width that is smaller than the first width, such that a cross-sectional area that is perpendicular to the sidewall of the first channel monotonically reduces from the first end of the first channel to the first interface region; and a second channel fluidically coupled between the first interface region and each of a plurality of heat exchangers; and a second manifold comprising:
a third channel comprising:
a first end dimensioned and arranged to fluidically couple with a second pontoon configured to convey the first fluid via a second port having a third width;
a sidewall that extends perpendicularly with respect to the first end of the third channel and parallel with respect to a direction of fluid flow; and
a second turning vane that extends from the first end of the third channel to a second interface region at a second end of the third channel, the first interface region having a fourth width that is smaller than the third width, such that a cross-sectional area that is perpendicular to the sidewall of the third channel monotonically reduces from the first end of the third channel to the second interface region at the second end of the third channel, wherein the first turning vane is parallel to the second turning vane; and
a fourth channel fluidically coupled between the second interface region at the second end of the third channel and each of the plurality of heat exchangers;
wherein the first pontoon further comprises a third port, the first port fluidically coupled with the third port; and
wherein the second port is configured to be fluidically coupled with a fourth port located at the second pontoon.

15. The heat-exchanger module of claim 14, further comprising the second pontoon fluidically coupled to the third channel.

\* \* \* \* \*